A. SCHMIDT.
Gas Retort.
No. 25,610. Patented Sept. 27, 1859.
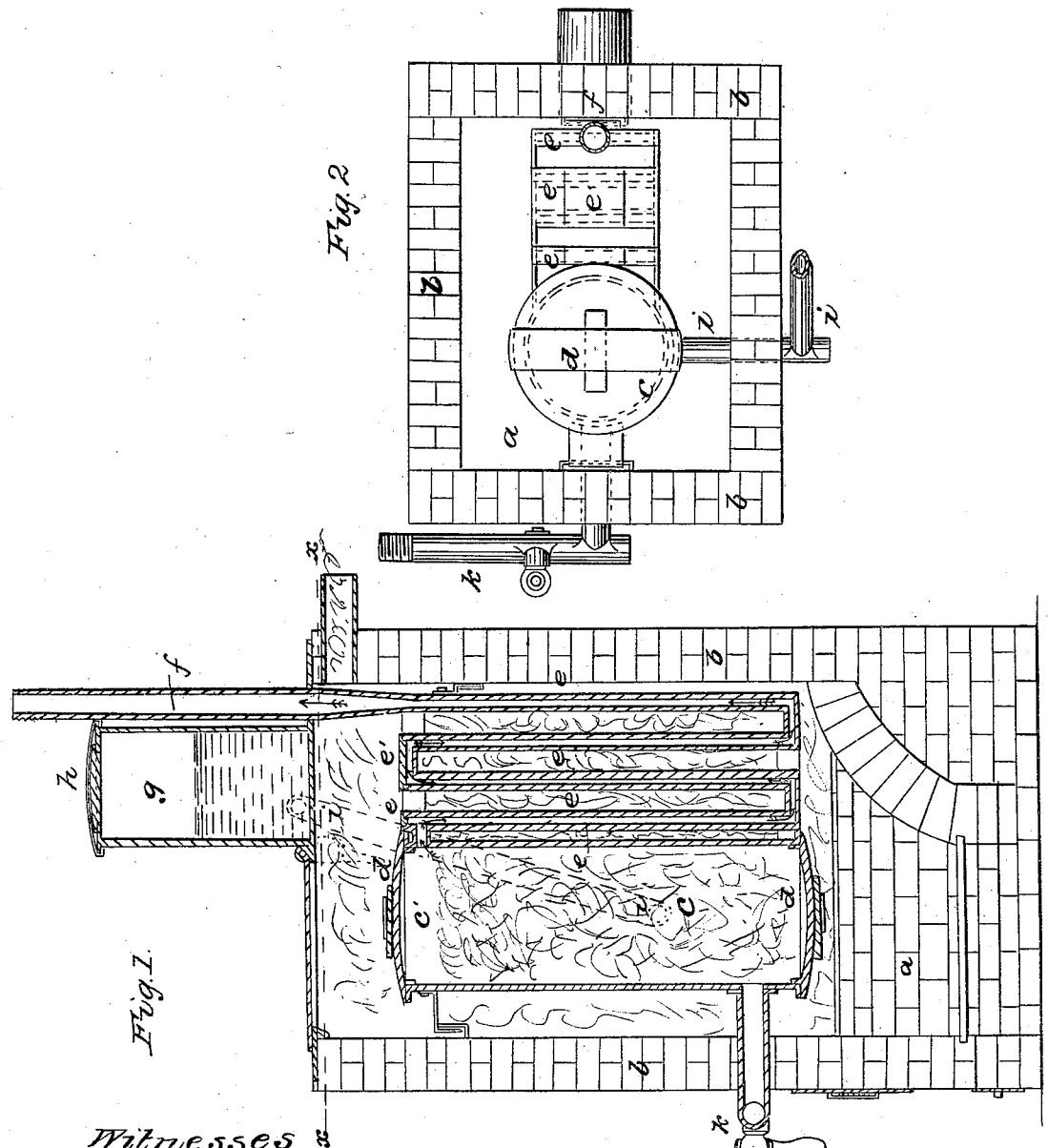

UNITED STATES PATENT OFFICE.

AUGUST SCHMIDT, OF NEW YORK, N. Y., ASSIGNOR TO HIMSELF AND CHAS. EDWD. SCHMIDT AND HERMAN SCHMIDT, OF SAME PLACE.

APPARATUS FOR MAKING GAS FROM ROSIN.

Specification of Letters Patent No. 25,610, dated September 27, 1859.

*To all whom it may concern:*

Be it known that I, AUGUST SCHMIDT, of the city and State of New York, have invented and made a certain new and useful Improvement in Retorts for Illuminating-Gas from Rosin or Similar Substances; and I do hereby declare that the following is a full, clear, and exact description of the construction and operation of the same, reference being had to the annexed drawing, making part of this specification, wherein—

Figure 1, is a vertical longitudinal section, and Fig. 2 is a plan of my apparatus below the line $x$, $x$, Fig. 1.

Similar letters indicate the same parts.

The nature of my said invention consists in arranging a retort and heating flues in such a manner as to receive a regulated supply of rosin or other material, rendered fluid by heat, onto coke contained in said retort and thereby form an illuminating gas of superior quality and quantity, with very little refuse in the retort and with but little attention.

In the drawing $a$, represents a suitable furnace surrounded by brickwork $b$, and containing the vertical retort $c$, supported in any convenient manner, and provided with movable covers $d$, $d$, at one or both ends.

$e$, $e$, are ascending and descending flues or retorts in which the gas generated in the retort $c$, becomes properly heated and combined for illuminating purposes, and passes away by the pipe $f$ for purification as usual. These flues $e$, $e$, may be fitted with movable covers or plates as at $e'$, for the purpose of cleaning.

On the top plate of the furnace I provide a receptacle or kettle $g$ into which rosin, pitch, coal tar, or similar material is placed, and $h$, is a movable cover thereto. $i$, is a pipe and cock leading from this kettle $g$ to the center of the retort $c$.

$k$, is a pipe and cock leading away from the bottom of the retort $c$, through which any substance that is not convertible into gas may be drawn; or through which oil or other material may be introduced to combine with the other articles in forming this illuminating gas.

I place into the retort $c$, coke and close the same air tight, and having built a fire the heat thereof melts the contents of the kettle $g$. I then permit a regulated supply to pass through the pipe $i$, which flowing over the coke is by the heat converted into gas, and this operation is perfected by the heat applied to said gas in the flues $e$, $e$. In all instances the gas passes up through the heated coke that aids in converting all the rosin or foreign particles into gas, and this operation is perfected in the flues or retorts $e$, $e$, as aforesaid.

Having thus described my said invention what I claim and desire to secure by Letters Patent is—

The retort $c$, and its flues $e$, $e$, combined with the receptacle or kettle $g$, and arranged in the manner and for the purposes specified.

In witness whereof I have hereunto set my signature this fifteenth day of August, 1859.

AUGUST SCHMIDT.

Witnesses:
LEMUEL W. SERRELL,
THOS. GEO. HAROLD.